United States Patent
Kleine et al.

(10) Patent No.: US 7,161,332 B1
(45) Date of Patent: Jan. 9, 2007

(54) REMOVING A PHASE IN MULTIPHASE DC/DC CONVERTER WITHOUT DISTURBING THE OUTPUT VOLTAGE

(75) Inventors: John S. Kleine, Cary, NC (US); Thomas A. Jochum, Durham, NC (US)

(73) Assignee: Intersil Americas, Inc., Mlpitas, CA (US)

( * ) Notice: Subject to any disclaimer, the term of this patent is extended or adjusted under 35 U.S.C. 154(b) by 0 days.

(21) Appl. No.: 11/225,532

(22) Filed: Sep. 13, 2005

Related U.S. Application Data

(60) Provisional application No. 60/624,788, filed on Nov. 3, 2004.

(51) Int. Cl.
  G05F 1/652 (2006.01)
  G05F 1/656 (2006.01)
(52) U.S. Cl. .................. 323/222; 323/284; 323/282; 323/285
(58) Field of Classification Search ........... 323/222, 323/284, 285
  See application file for complete search history.

(56) References Cited

U.S. PATENT DOCUMENTS

| | | | |
|---|---|---|---|
| 6,912,144 B1 * | 6/2005 | Clavette | 363/98 |
| 7,019,502 B1 * | 3/2006 | Walters et al. | 323/282 |
| 7,023,182 B1 * | 4/2006 | Kleine et al. | 323/212 |
| 7,030,596 B1 * | 4/2006 | Salerno et al. | 323/282 |
| 7,031,174 B1 * | 4/2006 | Lipcsei | 363/98 |

* cited by examiner

*Primary Examiner*—Bao Q. Vu
(74) *Attorney, Agent, or Firm*—Gary R. Stanford

(57) ABSTRACT

A phase removal control system for a multiphase DC/DC converter including combination logic, disable logic, and a current detector. The multiphase DC/DC converter includes first and second output phase circuits and a controller providing first and second PWM signals for the first and second output phase circuits, respectively. The combination logic combines the second PWM signal with the first PWM signal when a phase enable signal is de-asserted and while a current detect signal indicates current above a predetermined minimum current level. The disable logic passes the second PWM signal to the second output phase circuit when the phase enable signal is asserted and blocks the second PWM signal from the second output phase circuit when the phase enable signal is de-asserted. The current detector has an input for sensing current through the second output phase circuit and an output providing the current detect signal indicative thereof.

20 Claims, 3 Drawing Sheets

US 7,161,332 B1

REMOVING A PHASE IN MULTIPHASE DC/DC CONVERTER WITHOUT DISTURBING THE OUTPUT VOLTAGE

CROSS-REFERENCE TO RELATED APPLICATIONS

This application claims the benefit of U.S. Provisional Application No. 60/624,788 filed on Nov. 3, 2004, which is herein incorporated by reference for all intents and purposes.

BACKGROUND OF THE INVENTION

1. Field of the Invention

The present invention relates to multiphase DC/DC converters, and more particularly to removing a phase in a multiphase DC/DC converter while minimizing disturbance of the output voltage.

2. Description of the Related Art

Multiphase DC/DC converters distribute current to a load among multiple phases or channels to provide increased output power and to improve efficiency at high load levels. Many electronic devices include a low-power or reduced power mode to conserve energy or battery power. The multiphase converter becomes less efficient at lower power levels while all phases remain active, so that it is desired to shut down one or more phases during lower power levels to improve efficiency. Control logic of the device determines or detects power requirements and asserts a low power signal or the like to initiate a low power state. For example, many microprocessors detect or otherwise determine that less power is needed and that a reduced power mode of operation is advantageous.

In response to the low power signal, conventional multiphase DC/DC converters simply turned off a phase without adjusting the remaining one or more phases that remained active. Suddenly shutting down one or more phases caused the output voltage to decrease. The feedback loop operative to maintain the output voltage level responded to the reduced output voltage and adjusted the current in the remaining active phases to increase the falling output voltage back to the target level. The loop response, however, was insufficient to prevent a significant albeit temporary dip in the output voltage. The temporary decrease in output voltage may have deleterious effects on the system, and reduces overall efficiency.

It is desired to avoid a significant decrease in the output voltage level when removing one or more phases to achieve low power mode.

SUMMARY OF THE PRESENT INVENTION

A phase removal control system for a multiphase DC/DC converter according to an embodiment of the present invention includes combination logic, disable logic, and a current detector. The multiphase DC/DC converter includes first and second output phase circuits and a controller providing first and second pulse width modulation (PWM) signals for the first and second output phase circuits, respectively. The combination logic combines the second PWM signal with the first PWM signal when a phase enable signal is de-asserted and while a current detect signal indicates current above a predetermined minimum current level. The disable logic passes the second PWM signal to the second output phase circuit when the phase enable signal is asserted and blocks the second PWM signal from the second output phase circuit when the phase enable signal is de-asserted. The current detector has an input for sensing current through the second output phase circuit and an output providing the current detect signal indicative thereof.

The second output phase circuit may include a power buffer having a diode emulation mode input, where the phase removal control system includes an inverter having an input receiving the phase enable signal and an output for coupling to the diode emulation mode input of the power buffer. The power buffer is placed into diode emulation mode when the phase enable signal is de-asserted. The second output phase circuit may include a power buffer having a tri-state mode input, where the current detector has a second output for coupling to the tri-state mode input of the power buffer. The current detector places the power buffer in tri-state mode when the current logic detects the predetermined minimum current level through the second output phase circuit.

The combination logic may include an inverter, AND logic and OR logic. The inverter has an input receiving the phase enable signal and an output. The AND logic has a first input coupled to the output of the inverter, a second input for receiving the second PWM signal, a third input receiving the current detect signal, and an output. The OR logic has a first input for receiving the first PWM signal, a second input coupled to the output of the AND logic, and an output for coupling to the first output phase circuit. The disable logic may include AND logic having a first input for receiving the second PWM signal, a second input receiving the phase enable signal, and an output for coupling to the second output phase circuit.

The current detector may include a current sensor and a current comparator. The current sensor has an input for coupling to the second output phase circuit and an output providing a current sense signal. The current comparator has an input coupled to the output of the current sensor and an output providing the current detect signal. Alternatively, the current detector includes a comparator having an input for coupling to a phase node of the second output phase circuit. In this latter case, the comparator determines when the phase node rises to or near zero for detecting current through the second phase circuit.

A multiphase DC/DC converter according to an embodiment of the present invention includes a PWM controller, first and second output buffers, first and second output inductors, and a phase removal control system. The PWM controller provides first and second PWM signals. The first and second output buffers each have a PWM input and an output. The first output inductor has a first end coupled to the output of the first output buffer and a second end coupled to an output node. The second output inductor has a first end coupled to the output of the second output buffer and a second end coupled to the output node. The phase removal control system includes a current detect circuit and first and second logic. The current detect circuit is coupled to the second output inductor and asserts a current detect signal when current through the second output inductor is above a predetermined level. The first logic is coupled to the second output buffer and receives the second PWM signal and a phase enable signal with first and second states. The first logic passes the second PWM signal to the PWM input of second output buffer when the phase enable signal is in the first state and blocks the second PWM signal from the PWM input of the second output buffer when the phase enable signal is in the second state. The second logic receives the phase enable signal and the current detect signal, and provides the second PWM signal to the PWM input of the first output buffer when the phase enable signal is in the second state and while the current detect signal is asserted.

The current detect circuit of the multiphase DC/DC converter may include a current sensor and a current comparator. Alternatively, the current detect circuit includes a comparator having an input coupled to the output of the second output buffer. The first logic may include AND logic having a first input receiving the second PWM signal, a second input receiving the phase enable signal, and an output coupled to the PWM input of the second output buffer. The second logic may include an inverter, AND logic and OR logic. The AND logic has a first input coupled to the output of the inverter, a second input receiving the second PWM signal, a third input receiving the current detect signal, and an output. The OR logic has an input receiving the first PWM signal, a second input coupled to the output of the AND logic, and an output coupled to the PWM input of the first output buffer. The second output buffer may be configured to operate in a tri-state mode, where the current detect circuit places the second output buffer in the tri-state mode when current through the second output inductor decreases to the predetermined level. The second output buffer may be configured to operate in a diode emulation mode, where the first logic includes an inverter having an input receiving the phase enable signal and an output coupled to the second output buffer for placing the second output buffer in the diode emulation mode while the phase enable signal is in the second state.

A method of removing a phase of a multiphase DC/DC converter in response to a phase enable signal according to an embodiment of the present invention includes removing a second PWM signal from a second phase circuit, detecting current in the second phase circuit, and combining the second PWM signal with a first PWM signal and providing a combined PWM signal to a first phase circuit while current is detected in the second phase circuit. The method may include switching an output buffer in the second phase circuit to a diode emulation mode in response to the phase enable signal and while current is detected in the second phase circuit. The method may include switching the output buffer in the second phase circuit to a tri-state mode when current is no longer detected in the second phase circuit. The method may include sensing current through an output inductor of the second phase circuit, and comparing a level of sensed current with a predetermined minimum current level. The method may include monitoring voltage of a phase node of the second phase circuit.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
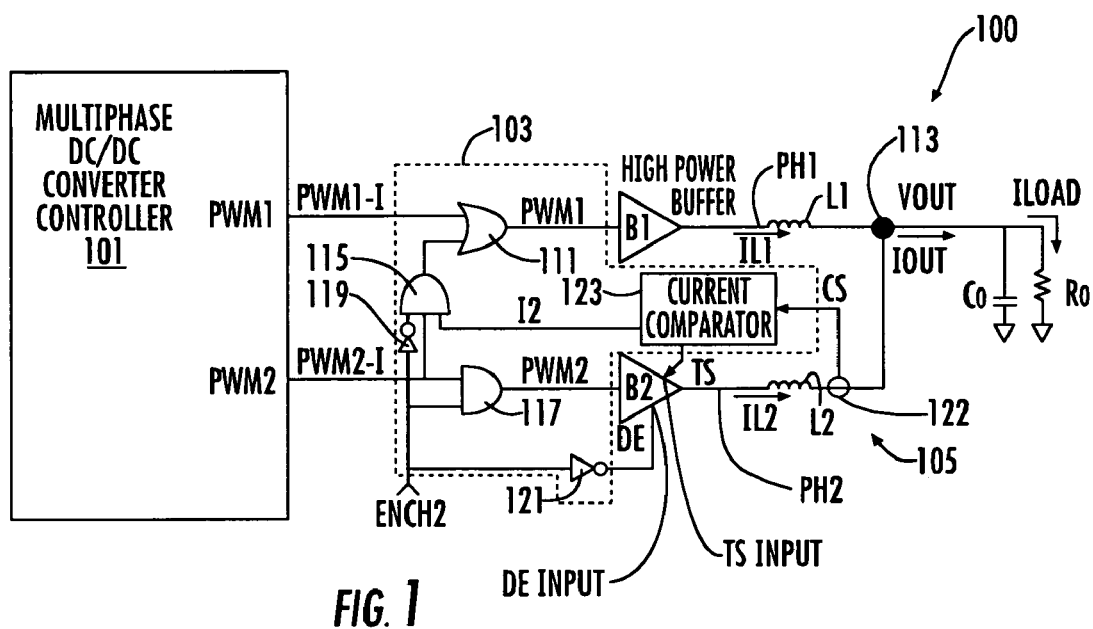
FIG. 1 is a simplified schematic diagram of a multiphase DC/DC converter including a phase removal control system implemented according to an exemplary embodiment of the present invention.

FIG. 1 is a simplified schematic diagram of a multiphase DC/DC converter 100 including a phase removal control system 103 implemented according to an exemplary embodiment of the present invention. The multiphase DC/DC converter 100 includes a multiphase DC/DC converter controller 101 asserting first and second pulse-width modulation (PWM) signals PWM1_I and PWM2_I, respectively, to the phase removal control system 103. The controller 101 may be implemented in any suitable manner including configurations known to those skilled in the art. The phase removal control system 103 outputs corresponding signals PWM1 and PWM2 to an output circuit 105, which includes first and second high power buffers B1 and B2, first and second output inductors L1 and L2, an output capacitor CO and an output load RO (shown as a resistor). The buffer B1 and inductor L1 form a first output phase circuit and the buffer B1 and inductor L2 form a second output phase circuit. The respective currents through the inductors L1 and L2 are shown as IL1 and IL2, respectively. Although not explicitly shown, a feedback circuit is included to detect the output voltage VOUT and/or other output parameters or values and to provide the detected output values back to the multiphase DC/DC converter controller 101 for purposes of control. The multiphase DC/DC converter 100, which includes the multiphase DC/DC converter controller 101, is illustrated as including two phases or channels. It is understood, however, that the present invention applies to any number of phases or channels and is not limited to two-phase applications.

For the first phase, the PWM1_I signal from the controller 101 is provided to one input of a two-input OR gate 111 of the phase removal control system 103. The OR gate 111 asserts the PWM1 signal at its output to the input of the buffer B1 of the output circuit 105. The buffer B1 asserts a phase signal PH1 at its output to one end of the inductor L1, having its other end coupled to an output node 113 which develops the VOUT signal. The PH1 signal is a power-amplified version of the PWM1 signal. For the second phase, the PWM2_I signal from the controller 101 is provided to one input of a three-input AND gate 115 and to one input of a two-input AND gate 117 of the phase removal control system 103. The output of the AND gate 115 is coupled to the other input of the OR gate 111 and the output of the AND gate 117 provides the PWM2 signal to the input of the buffer B2 of the output circuit. The buffer B2 asserts a second phase signal PH2 to one end of the inductor L2, having its other end coupled to the output node 113. The PH2 signal is a power-amplified version of the PWM2 signal. The capacitor C0 and load R0 are coupled in parallel between node 113 and ground, which is typically a power ground node. The inductor currents IL1 and IL2 collectively flowing into the capacitor C0 and the load R0 are collectively shown as the output current IOUT, and the current through the load R0 is shown as the load current ILOAD.

A channel 2 digital or binary phase enable signal ENCH2 is provided to an input of a first inverter 119, to the other input of the AND gate 117, and to the input of a second inverter 121. The terms "phase" and "channel" as used herein generally refer to the same circuit legs or portions collectively contributing to the output current during normal operation. The ENCH2 signal is otherwise referred to as a phase enable signal which, in the illustrated embodiment, is asserted high to enable the second output phase circuit and is de-asserted low to disable the second output phase circuit. The output of the inverter 119 is provided to a second input of the AND gate 115 and the output of the inverter 121 provides a diode emulation (DE) signal to a diode emulation or DE mode input of the buffer B2. The buffer B2 operates normally to boost the power of the PWM2 signal when its mode input is low, and is operated in a diode-emulation mode when its diode emulation mode input is high (unless the buffer B2 is placed into tri-state mode, described further below).

The illustrated phase removal control system 103 includes a current sensor 122 which detects the current IL2 of the inductor L2 and outputs a current sense signal CS to a current comparator 123. The current sensor 122 may be implemented in any suitable manner known to those skilled in the art. Although shown coupled to the node 113, the current sensor 122 is coupled to the inductor L2 in any suitable manner for sensing current. The current comparator 123 monitors the current IL2 and outputs a corresponding digital signal I2 to the third input of the AND gate 115. The current comparator 123 asserts the I2 signal to a high logic state while the current IL2 is greater than zero, and then asserts I2 to the low logic state when IL2 reaches a predetermined minimum current level, such as zero amperes (Amps) or near 0 Amps. The current comparator 123 is implemented in any one of many different ways as well known to those skilled in the art. In one embodiment, the current comparator 123 asserts the I2 signal high to indicate current while the CS signal is above the predetermined minimum current level, and switches the I2 signal low to indicate no current when the CS signal is at or below the predetermined minimum current level. The current comparator 123 also asserts a tri-state (TS) signal to a tri-state or TS input of the buffer B2.

Diode-emulation mode, as understood by those skilled in the art, generally means that an output buffer operates in a similar as the normal state until the current in the corresponding output inductor goes negative (or reverses direction). When the output current goes negative, the output of the buffer is turned off or otherwise tri-stated until the next PWM cycle. Diode emulation is used to enhance efficiency in certain configurations. In the tri-state mode of operation, the output of the buffer is tri-stated regardless of the input PWM signal. In the illustrated embodiment, the buffer B2 operates in the normal mode when both DE and TS inputs are de-asserted low. The buffer B2 operates in tri-state mode when the TS input is asserted high (regardless of the state of the DE input). The buffer B2 operates in diode-emulation mode when the DE input is asserted high and the TS input is de-asserted low.

Figure 2:
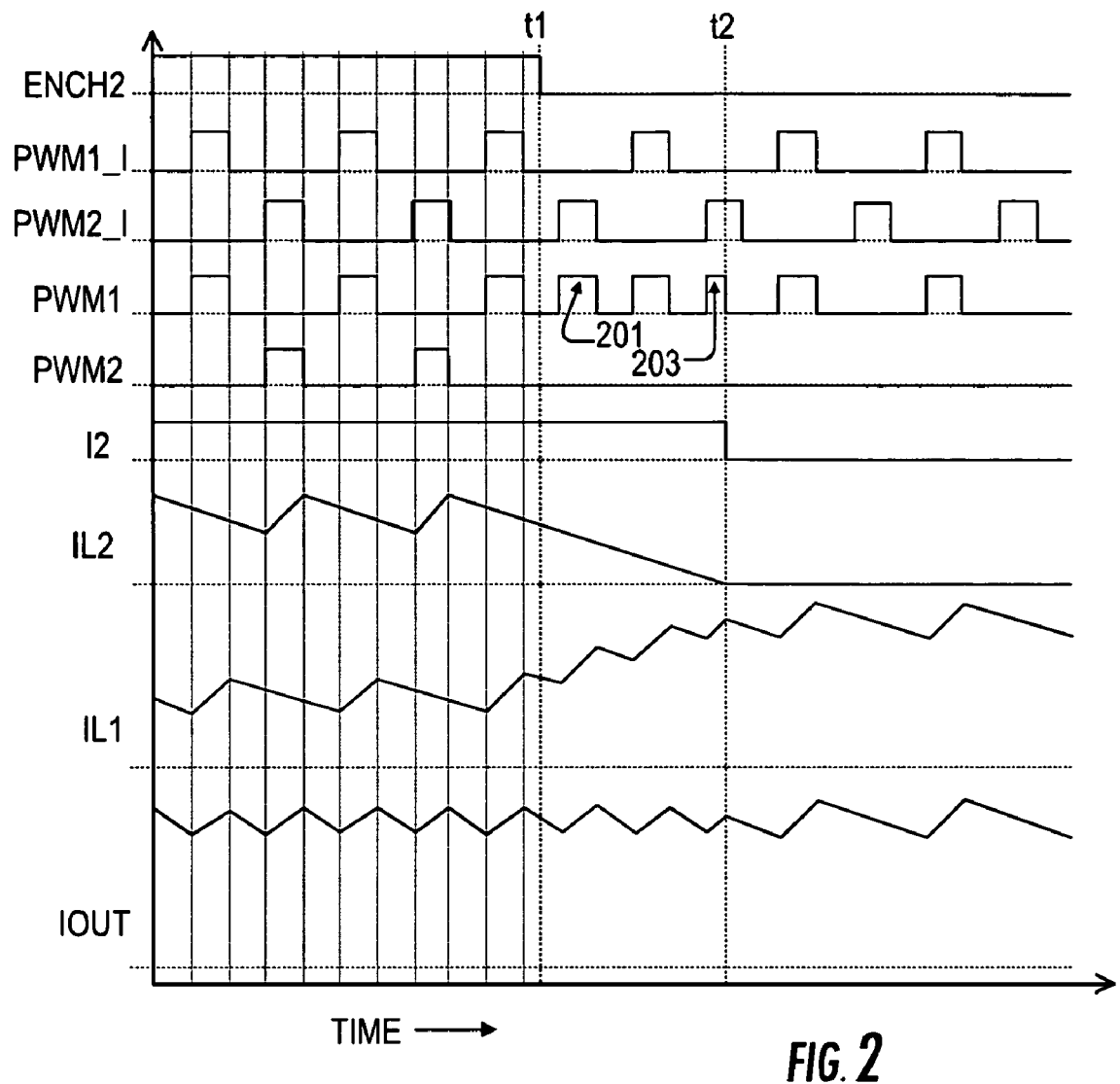
FIG. 2 is a timing diagram illustrating operation of the phase removal control system of FIG. 1.

FIG. 2 is a timing diagram illustrating operation of the phase removal control system of FIG. 1. The ENCH2, PWM1_I, PWM2_I, PWM1, PWM2, I2, IL2, IL1 and IOUT signals are plotted versus time. In operation, the multiphase DC/DC converter controller 101 operates as though both channels are always active and continually alternates pulses on the PWM1_I and PWM2_I signals. The OR gate 111 passes the pulses of the PWM1_I signal as corresponding pulses on the PWM1 signal to the buffer B1 of the first phase. The ENCH2 signal is initially at a high logic state for normal full power operation when both phases are operating. While the ENCH2 signal is high, the output of the AND gate 115 is held low, the AND gate 117 passes the pulses of the PWM2_I signal to corresponding pulses on the PWM2 signal, and the output of the buffer B2 is enabled for the second phase circuit. Thus, while ENCH2 is high, the PWM1_I and PWM2_I signals are forwarded as the PWM1 and PWM2 signals, respectively, which are amplified by the buffers B1 and B2, respectively, and the phase signals PH1 and PH2 drive the output inductors L1 and L2, respectively, to develop the VOUT signal.

The IL1 and IL2 current signals illustrate that both phases are operative and both include a ripple waveform. The IL1 current has a positive linear slope and increases while the PWM1 and PH1 signals are high, and has a negative linear slope and decreases when the PWM1 and PH1 signals are low. Likewise, the IL2 current has a positive linear slope and increases while the PWM2 and PH2 signals are high, and has a negative linear slope and decreases when the PWM2 and PH2 signals are low. The IOUT current is a combination (e.g., sum) of the IL1 and IL2 currents and is shown with its corresponding ripple waveform.

The ENCH2 signal is de-asserted low at a time t1 to start the process of removing the second phase circuit associated with the output inductor L2. The ENCH2 signal is provided by power control logic (not shown) or a microprocessor (not shown) or the like. When the ENCH2 signal is de-asserted low, the PWM2 signal at the output of the AND gate 117 is held low and the DE input to the buffer B2 is pulled high by the inverter 121. The PWM2 signal remains low while ENCH2 is low so that it no longer pulses. The current IL2 through the inductor L2 does not immediately drop to zero but begins ramping down beginning at time t1, so that the I2 signal initially remains high. The buffer B2 is initially place into diode-emulation mode so that the current IL2 eventually decreases to zero and then stays at zero while the ENCH2 signal is low. When the current comparator 123 detects the current IL2 at zero (or below zero or any predetermined minimum current level), it asserts the TS signal to place the buffer B2 to tri-state mode in which the output of the buffer B2 is tri-stated.

While I2 is high after EHCH2 goes low, the pulses of the PWM2_I signal that normally go to the second phase as the PWM2 signal are diverted to the OR gate 111 by the AND gate 115 so that the PWM1 signal effectively combines the pulses of both PWM1_I and PWM2_I. As shown, for example, the next pulse on the PWM1 signal after time t1, shown at 201, is the next pulse from PWM2_I diverted to the first phase. The extra pulses on the PWM1 signal cause the IL1 current in the first phase inductor L1 to ratchet upwards. The combined IL1 and IL2 currents, shown as IOUT, effectively remains constant while IL2 decreases and IL1 increases because the current lost from IL2 is gained in IL1. Since the output current IOUT does not significantly change during this transition from two-phase operation to one-phase operation, the VOUT signal at node 113 remains relatively constant.

When the current comparator 123 detects that the IL2 current has decreased to the minimum level (e.g., zero), it pulls the I2 signal low as shown at a time t2. When I2 goes low, the output of the AND gate 115 is held low so that the PWM2_I pulses are no longer diverted to the PWM1 signal. If the I2 signal is asserted low during a current pulse on the PWM1 signal, as shown at 203, then that pulse is cut short and the PWM1 signal returns to its usual pulse pattern after time t2. After time t2, the output current, IOUT, is developed solely by the IL1 current and so it has larger ripple and lower frequency. Also, the buffer B2 is placed into a tri-state mode of operation. During the entire transition process from two phases to one, the IOUT current remains substantially equal to the ILOAD current except for the ripple and so no additional charge is taken from or added to the output capacitor C0. Thus the output voltage VOUT remains substantially the same except for output voltage ripple. It is noted that there is a small, second-order error just as IL2 reaches the minimum level or zero at about time t2. The IOUT current is marginally smaller than ILOAD for a portion of a cycle and VOUT experiences a minor albeit negligible dip. Nonetheless, operation of the phase removal control system ensures minimal impact on the output current and voltage.

The AND gate 115 and the OR gate 111 collectively form combination logic which combines the PWM1_I and PWM2_I signals at the output of the OR gate 111 as the PWM1 signal when the ENCH2 signal is de-asserted and while the I2 signal is high. The AND gate 117 forms disable logic which passes the PWM2_I signal to the buffer B2 only while the ENCH2 signal is asserted, but which otherwise blocks the PWM2_I signal from the buffer B2. The current sensor 122 and the current comparator 123 collectively form a current detector or current detect circuit for sensing current in the output inductor L2 of the second output phase circuit. The current sensor 122 may be implemented in any suitable manner.

As shown in FIG. 2, the output currents IL1 and IL2 are both shown operating above zero Amps during the entire cycle. It is possible that the ripple is relatively large such that the current in one or both phases dips below zero. If the ENCH2 signal is de-asserted low when the current IL2 through the output inductor L2 is at or below zero, the current comparator 123 switches the buffer B2 into tri-state mode and none of the PWM2_I pulses are diverted to the first phase circuit. This is acceptable, however, since the output current of the second phase circuit is already at a relatively low level and does not appreciably change so that the output voltage remains relatively constant. Additional synchronization logic (not shown) may be included to avoid switching the buffer B2 into tri-state mode until the impact on the output current is negligible.

Figure 3:
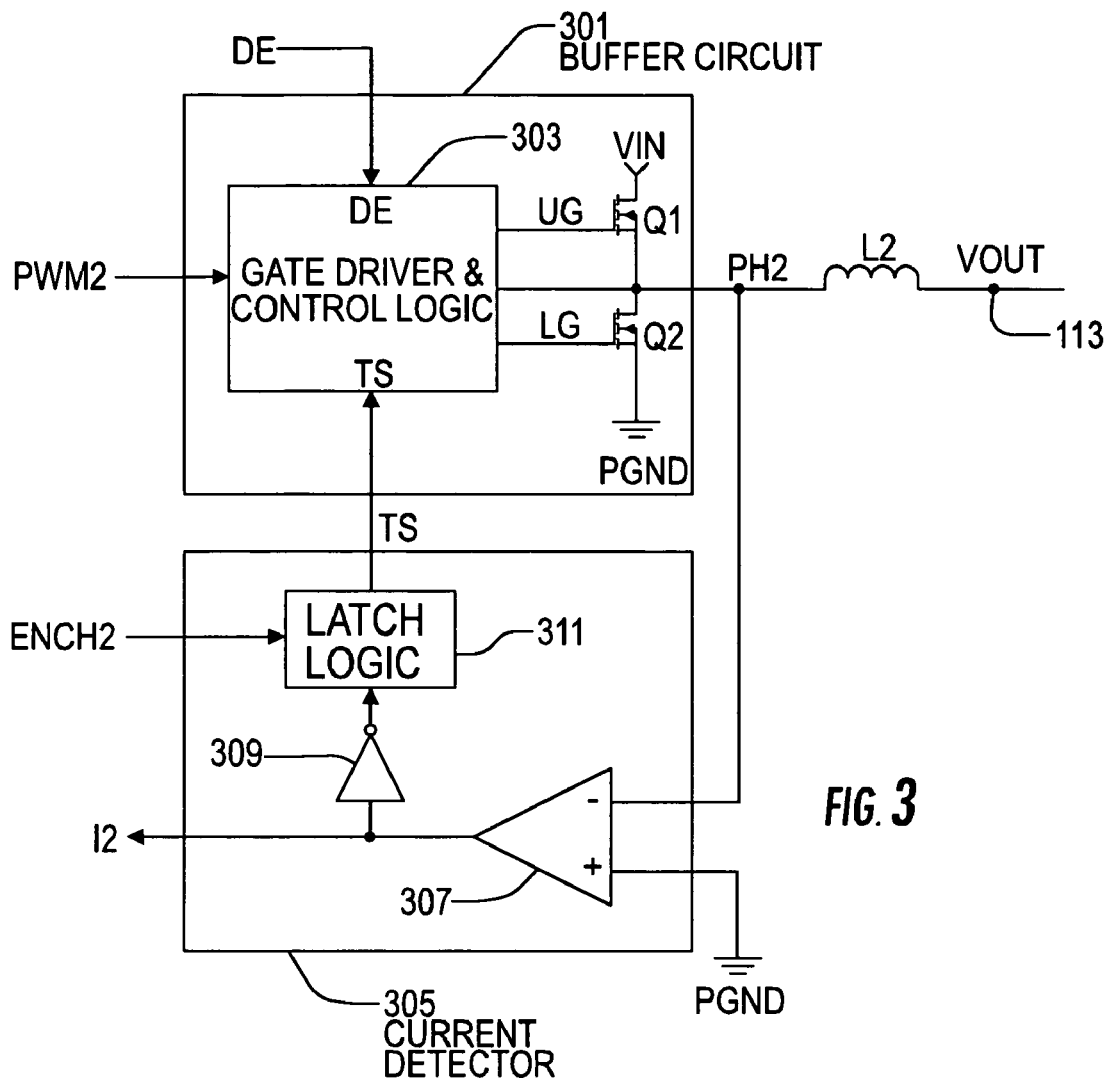
FIG. 3 is a simplified schematic and block diagram of an exemplary buck-type power buffer circuit and current detect circuit illustrating exemplary embodiments of corresponding buffer and current detect circuits of FIG. 1

FIG. 3 is a simplified schematic and block diagram of an exemplary buck-type power buffer circuit 301 and current detect circuit 305. The power buffer circuit 301 illustrates an exemplary embodiment of the power buffer B2 and the current detect circuit 305 illustrates a corresponding exemplary configuration for replacing the current sensor 122 and current comparator 123. The PWM2 signal is provided to gate driver & control logic 303 within the power buffer circuit 301. The gate driver & control logic 303 receives the DE and TS signals and controls the turn-on and turn-off of a pair of electronic power switching devices or switches Q1 and Q2. In particular, the gate driver & control logic 303 generates an upper gate switching signal UG provided to the control terminal (e.g., gate) of the upper (or high side) switch Q1 and generates a lower gate switching signal LG provided to the control terminal of the lower (or low side) switch Q2. In the particular configuration shown, the switches Q1 and Q2 are depicted as N-channel metal-oxide-semiconductor field-effect transistors (MOSFETs) having their drain-source current paths coupled in series between a pair of power supply rails (e.g., VIN and power ground (PGND)). Other types of electronic switching devices are contemplated. The drain of switch Q1 is coupled to an input voltage signal VIN and its source is coupled to the drain of switch Q2 at the PH2 node. The source of Q2 is coupled to a power reference or common voltage level, referred to as PGND.

The PH2 node is coupled to one end of the output inductor L2, having its other end coupled to the output node 113 developing the output signal VOUT as previously described. The PH2 node is further coupled to the inverting input of a comparator 307 within the current detect circuit 305. The non-inverting input of the comparator 307 is coupled to PGND and its output develops the I2 signal. The I2 signal is shown provided to the input of an inverter 309, having its output coupled to an input of latch logic 311. The latch logic 311 has another input receiving the ENCH2 signal and an output providing the TS signal to a TS input of the gate driver & control logic 303.

In operation, only one of the switches Q1 or Q2 is turned on at any given time (i.e., both are not turned on at the same time). The upper switch Q1 is turned on to couple the VIN to the output inductor L2 causing the current to increase, and then the upper switch Q1 is turned off and the lower switch Q2 is turned on to couple the inductor L2 to PGND for the remainder of the PWM cycle causing the current to decrease. When the DE input is asserted high to invoke diode-emulation, the lower switch Q2 is turned off when the current through the output inductor L2 goes negative or otherwise reaches a minimum level, and then both switches remain off during the remainder of the cycle. When the TS input is asserted high in the tri-state mode of operation, both switches Q1 and Q2 are turned off and remain off regardless of the input PWM2 signal. In the illustrated embodiment, the buffer circuit 301 operates in the normal PWM mode when both DE and TS inputs are de-asserted low. The buffer circuit 301 operates in tri-state mode when the TS input is pulled high (regardless of the state of the DE input). The buffer circuit 301 operates in diode-emulation mode when the DE input is pulled high and the TS input is pulled low.

When the lower switch Q2 is on and current is flowing from PGND to VOUT via the inductor L2, the voltage of the PH2 node is negative. At this time, the comparator 307 asserts the I2 signal high since PH2 is less than PGND. As the current decreases, the PH2 node voltage increases and eventually crosses zero when the current through the inductor L2 is zero. Then the comparator 307 pulls I2 low which causes the output of the inverter 311 to go high. The latch logic 311 asserts the TS signal high in response to I2 going low only when the ENCH2 signal is de-asserted low, which prevents the gate driver & control logic from placing the buffer circuit 301 in tri-state mode during normal operation. It is noted that an additional offset voltage source (not shown) may be inserted between the PH2 node and the comparator 307 so that the comparator 307 instead switches when PH2 is just below zero.

It is noted that switching to diode-emulation mode is optional depending upon the specific configuration of the power buffer. In the buck-type configuration described above using two electronic switches Q1 and Q2, since the PWM2_I pulses are blocked by the AND gate 117 when the ENCH2 signal is de-asserted low, the PWM2 signal remains low and the buffer circuit 301 initially operates as normal in the second half of the PWM cycle keeping the lower switch Q2 on. And when the current IL2 through the inductor L2 reaches the predetermined minimum level, the comparator 307 switches the buffer circuit 301 into tri-state mode so that the lower switch Q2 is turned off in a similar manner as the diode-emulation mode. Also, in an alternative embodiment, the buffer circuit 301 is simply switched to tri-state mode immediately in response to the I2 signal going low when the ENCH2 signal has been de-asserted high if the lower switch Q2 is implemented as a MOSFET. This is because the internal diode of the lower switch Q2 enables current to flow through the inductor L2 even when Q2 is turned off. This immediate tri-state mode of operation is somewhat less advantageous since additional power is consumed in the diode while current is flowing as compared to the switch Q2 being turned fully on.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A phase removal control system for a multiphase DC/DC converter, wherein said multiphase DC/DC converter comprises first and second output phase circuits and a controller providing first and second pulse width modulation (PWM) signals for the first and second output phase circuits, respectively, said phase removal control system comprising:
    combination logic which combines the second PWM signal with the first PWM signal when a phase enable signal is de-asserted and while a current detect signal indicates current above a predetermined minimum current level;
    disable logic which passes the second PWM signal to the second output phase circuit when said phase enable signal is asserted and which blocks the second PWM signal from the second output phase circuit when said phase enable signal is de-asserted; and
    a current detector having an input for sensing current through the second output phase circuit and an output providing said current detect signal indicative thereof.

2. The phase removal control system of claim 1, wherein the second output phase circuit includes a power buffer having a diode emulation mode input, further comprising an inverter having an input receiving said phase enable signal and an output for coupling to the diode emulation mode input of the power buffer, wherein the power buffer is placed into diode emulation mode when said phase enable signal is de-asserted.

3. The phase removal control system of claim 1, wherein the second output phase circuit includes a power buffer having a tri-state mode input, wherein said current detector has a second output for coupling to the tri-state mode input of the power buffer, wherein said current detector places said power buffer in tri-state mode when said current logic detects said predetermined minimum current level through the second output phase circuit.

4. The phase removal control system of claim 1, wherein the second output phase circuit includes a power buffer having a diode emulation mode input and a tri-state mode input, and wherein said current detector has a second output for coupling to the tri-state mode input of the power buffer, said phase removal control system further comprising:
    an inverter having an input receiving said phase enable signal and an output for coupling to the diode emulation mode input of the power buffer, wherein the power buffer is placed into diode emulation mode when said phase enable signal is de-asserted; and
    wherein said current detector places said power buffer in tri-state mode when said current logic detects said predetermined minimum current level through the second output phase circuit.

5. The phase removal control system of claim 1, wherein said combination logic comprises:
    an inverter having an input receiving said phase enable signal and an output;
    AND logic having a first input coupled to said output of said inverter, a second input for receiving the second PWM signal, a third input receiving said current detect signal, and an output; and
    OR logic having a first input for receiving the first PWM signal, a second input coupled to said output of said AND logic, and an output for coupling to the first output phase circuit.

6. The phase removal control system of claim 1, wherein said disable logic comprises AND logic having a first input for receiving the second PWM signal, a second input receiving said phase enable signal, and an output for coupling to the second output phase circuit.

7. The phase removal control system of claim 1, wherein said current detector comprises:
    a current sensor having an input for coupling to the second output phase circuit and an output providing a current sense signal; and
    a current comparator having an input coupled to said output of said current sensor and an output providing said current detect signal.

8. The phase removal control system of claim 1, wherein the second output phase circuit includes a phase node, and wherein said current detector comprises a comparator having an input for coupling to the phase node.

9. A multiphase DC/DC converter, comprising:
    a pulse width modulation (PWM) controller which provides first and second PWM signals;
    first and second output buffers each having a PWM input and an output;
    a first output inductor having a first end coupled to said output of said first output buffer and a second end coupled to an output node;
    a second output inductor having a first end coupled to said output of said second output buffer and a second end coupled to said output node; and
    a phase removal control system, comprising:
        a current detect circuit, coupled to said second output inductor, which asserts a current detect signal when current through said second output inductor is above a predetermined level;
        first logic, coupled to said PWM input of said second output buffer and receiving said second PWM signal and a phase enable signal having first and second states, that passes said second PWM signal to said PWM input of second output buffer when said phase enable signal is in said first state and that blocks said second PWM signal from said PWM input of said second output buffer when said phase enable signal is in said second state; and
        second logic, receiving said phase enable signal and said current detect signal, that provides said second PWM signal to said PWM input of said first output buffer when said phase enable signal is in said second state and while said current detect signal is asserted.

10. The multiphase DC/DC converter of claim 9, wherein said current detect circuit comprises:
   a current sensor having an input coupled to said second output inductor and an output providing a current sense signal; and
   a current comparator having an input receiving said current sense signal and an output providing said current detect signal.

11. The multiphase DC/DC converter of claim 9, wherein said current detect circuit comprises a comparator having an input coupled to said output of said second output buffer.

12. The multiphase DC/DC converter of claim 9, wherein said first logic comprises AND logic having a first input receiving said second PWM signal, a second input receiving said phase enable signal, and an output coupled to said PWM input of said second output buffer.

13. The multiphase DC/DC converter of claim 9, wherein said second logic comprises:
   an inverter having an input receiving said phase enable signal and an output;
   AND logic having a first input coupled to said output of said inverter, a second input receiving said second PWM signal, a third input receiving said current detect signal, and an output; and
   OR logic having an input receiving said first PWM signal, a second input coupled to said output of said AND logic, and an output coupled to said PWM input of said first output buffer.

14. The multiphase DC/DC converter of claim 9, wherein:
   said second output buffer is configured to operate in a tri-state mode; and
   wherein said current detect circuit places said second output buffer in said tri-state mode when current through said second output inductor decreases to said predetermined level.

15. The multiphase DC/DC converter of claim 9, wherein said second output buffer is configured to operate in a diode emulation mode, and wherein said first logic comprises an inverter having an input receiving said phase enable signal and an output coupled to said second output buffer for placing said second output buffer in said diode emulation mode while said phase enable signal is in said second state.

16. A method of removing a phase of a multiphase DC/DC converter in response to a phase enable signal, the multiphase DC/DC converter comprising first and second phase circuits and a controller providing first and second pulse width modulation (PWM) signals for the first and second phase circuits, respectively, said method comprising:
   removing the second PWM signal from the second phase circuit;
   detecting current in the second phase circuit; and
   combining the second PWM signal with the first PWM signal and providing the combined PWM signal to the first phase circuit while current is detected in the second phase circuit.

17. The method of claim 16, further comprising switching an output buffer in the second phase circuit to a diode emulation mode in response to the phase enable signal and while current is detected in the second phase circuit.

18. The method of claim 16, further comprising switching an output buffer in the second phase circuit to a tri-state mode when current is no longer detected in the second phase circuit.

19. The method of claim 16, wherein said detecting current in the second phase circuit comprises:
   sensing current through an output inductor of the second phase circuit; and
   comparing a level of sensed current with a predetermined minimum current level.

20. The method of claim 16, the second phase circuit including a phase node, wherein said detecting current in the second phase circuit comprises monitoring voltage of the phase node.

* * * * *